Figure 1:
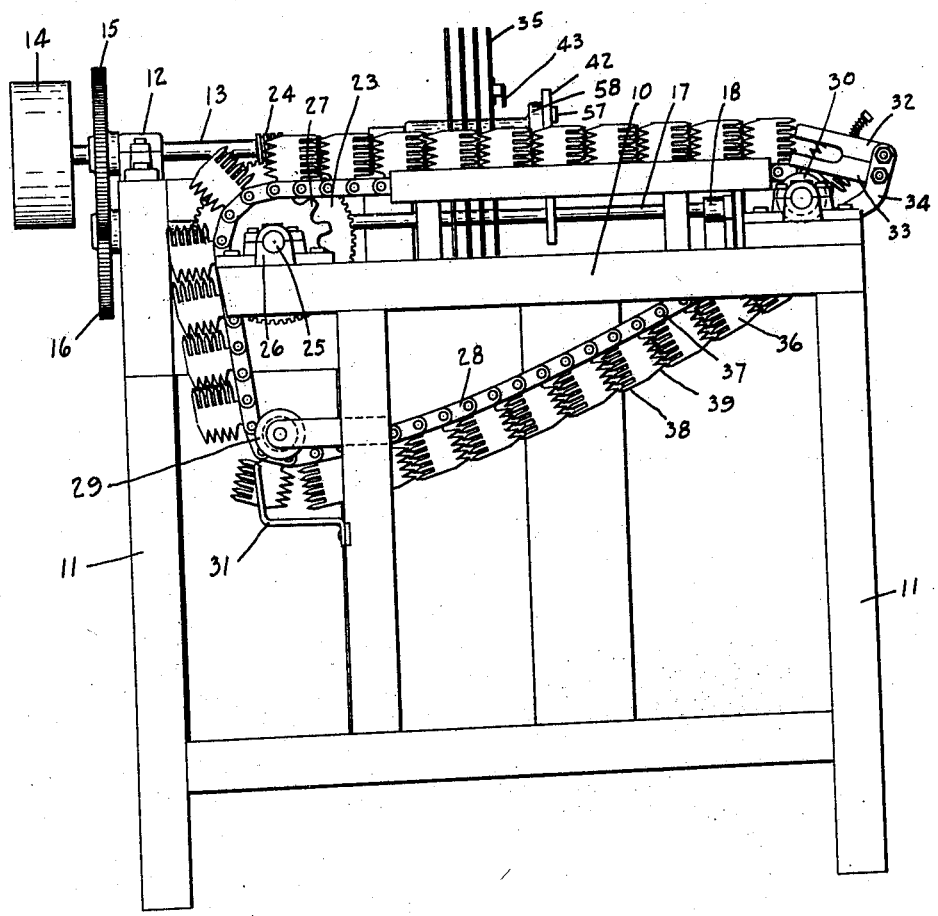

G. A. LOWRY.
CORN HUSKING AND SHREDDING MACHINE.
APPLICATION FILED JAN. 3, 1921.

1,408,304.

Patented Feb. 28, 1922.
3 SHEETS—SHEET 1.

INVENTOR.
GEORGE A. LOWRY.
BY
*ATTORNEYS.*

G. A. LOWRY.
CORN HUSKING AND SHREDDING MACHINE.
APPLICATION FILED JAN. 3, 1921.
1,408,304.
Patented Feb. 28, 1922.
3 SHEETS—SHEET 2.
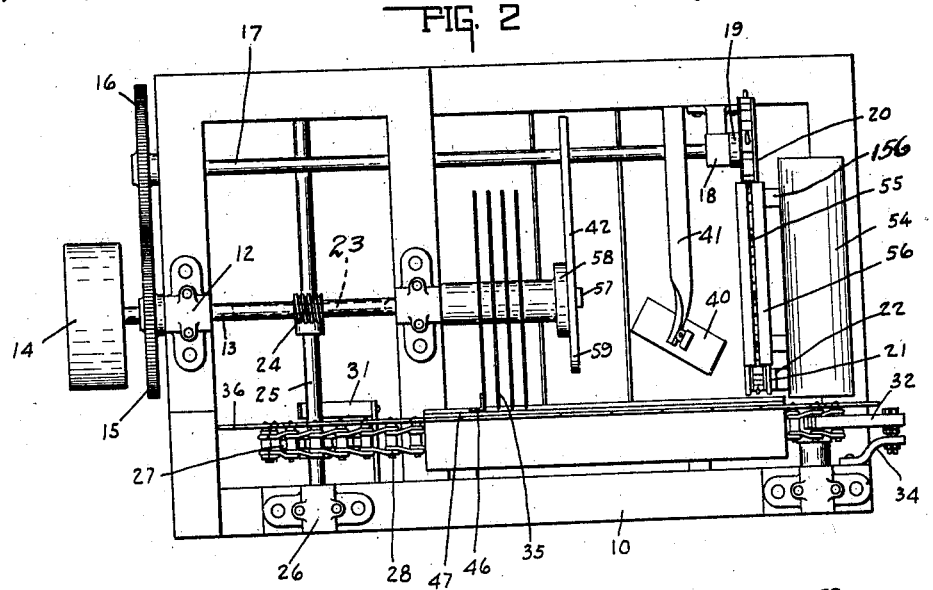
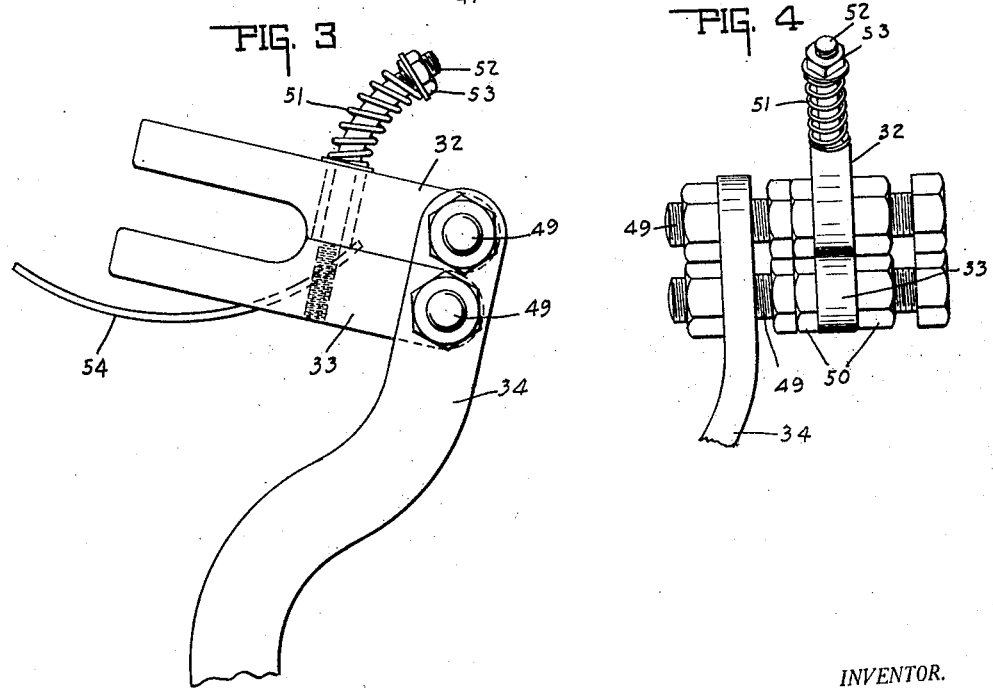
INVENTOR.
GEORGE A. LOWRY.
BY
ATTORNEYS.

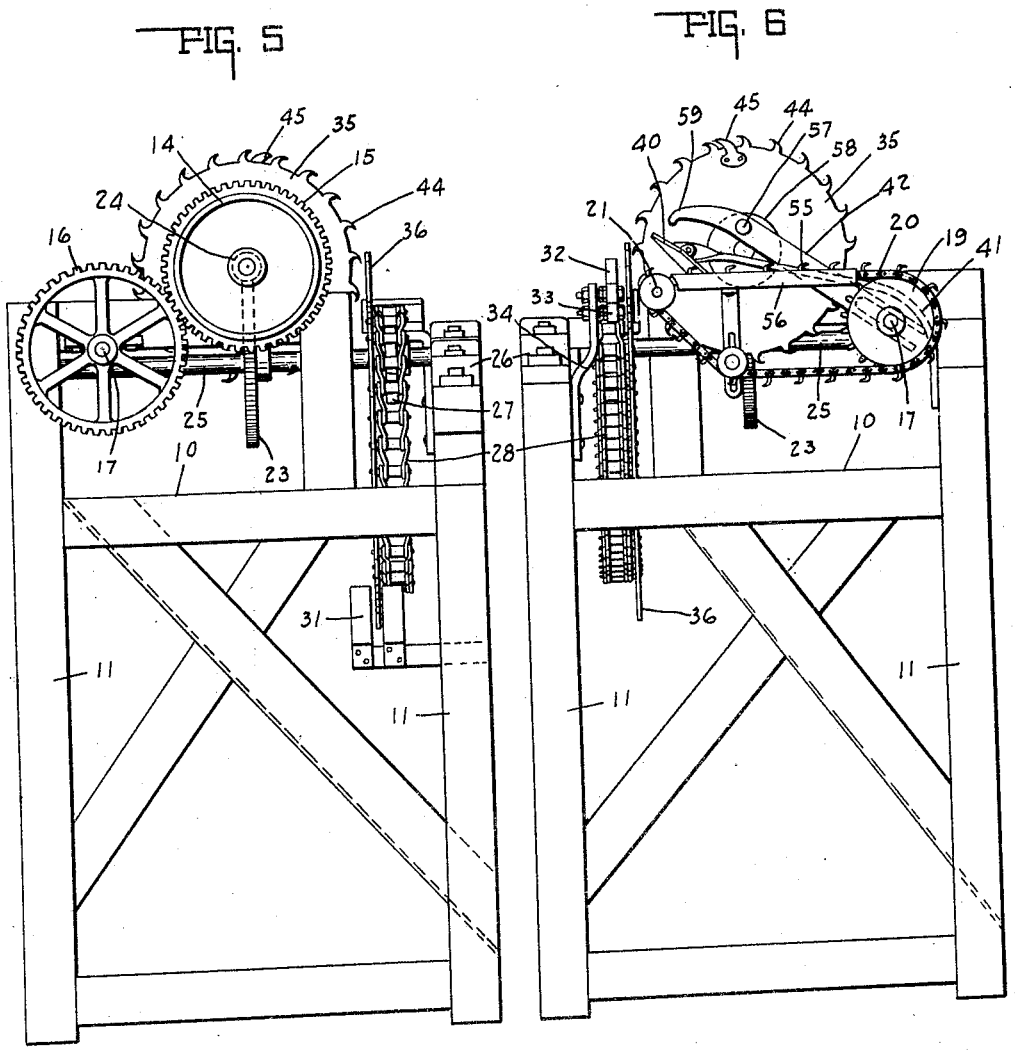

UNITED STATES PATENT OFFICE.

GEORGE A. LOWRY, OF CHICAGO, ILLINOIS, ASSIGNOR OF ONE-HALF TO BERTHA McNALLY LOWRY, OF MILWAUKEE, WISCONSIN, AND ONE-HALF TO A. BLAIR RIDINGTON, OF ST. LOUIS, MISSOURI.

CORN HUSKING AND SHREDDING MACHINE.

1,408,304.  Specification of Letters Patent.  Patented Feb. 28, 1922.

Application filed January 3, 1921. Serial No. 434,858.

*To all whom it may concern:*

Be it known that I, GEORGE A. LOWRY, a citizen of the United States, and a resident of Chicago, county of Cook, and State of Illinois, have invented a certain new and useful Corn Husking and Shredding Machine; and I do hereby declare that the following is a full, clear, and exact description thereof, reference being had to the accompanying drawings, in which like numerals refer to like parts.

This invention relates to a shucking and shredding machine for corn, and is particularly adapted for use in canning factories, corn mills, and on farms for rapidly and mechanically removing the ear of corn from the shuck, cutting the butt therefrom, and shredding the shuck so as to make it marketable for packing, suffing and padding purposes. This invention embodies certain improvements over the application filed by George A. Lowry on the 20th day of September, 1920, Serial No. 411,534 and patented January 31, 1922, #1,404,779.

One feature of the invention consists in the construction of the jaws for gripping and carrying ears of corn through the machine, whereby it will not only bite off the shuck after the ear is removed, but will hold the shuck in such a manner that it may be easily stripped off and removed from the jaws in conjunction with an engaging member for removing the butts therefrom.

Another feature of the invention resides in the adjustable and yielding feeding jaw for enabling the ear of corn to be properly fed into the machine.

Another feature of the invention resides in a striking arm for striking the ear of corn after it has been cut from the butt and knocking it from the shuck.

The full nature of the drawings will be understood from the accompanying drawings and the following description and claims.

In the drawings, Fig. 1 shows a side elevation of the machine. Fig. 2 shows a plan view thereof. Fig. 3 shows a side elevation of an enlarged view of the feeding jaw. Fig. 4 is an end elevation thereof. Fig. 5 is an end elevation of the machine showing the means for removing the butt from the shuck. Fig. 6 is an end elevation of the machine taken from the opposite end shown in Fig. 5 showing the striking arm for removing the ear from the shuck.

In the drawings there is shown a machine mounted on a frame 10 supported by the legs 11. Mounted on the cross bars of the frame 10, there are bearings 12 through which a central driving shaft 13 extends having a pulley 14 mounted on one end thereof and arranged to be driven by a belt from any suitable source of power. Keyed to the shaft 13, there is a driving gear 15 adapted to mesh with the gears 16 keyed to the shaft 17 which is mounted in the bearings 18. Keyed on the shaft 17, there is a sprocket wheel 19 which drives an endless chain 20 for ripping open the shuck, said chain being supported at one end by the idler sprocket 21 mounted in the bearing 22. Keyed to the shaft 13, is a worm 23 adapted to mesh with a driving worm gear 24, which is secured to the shaft 25 mounted in the bearings 26 supported by said frame. Keyed to the shaft 25, is a sprocket wheel 27 which drives an endless chain 28 about an adjustable idler sprocket 29 and an end idler sprocket 30. Mounted on the opposite end of the shaft 13 from the pulley 14, is a shredding wheel 35 consisting of a plurality of shredding disks which are revolved by said shaft and pulley. The foregoing constitutes the mechanism of the machine by means of which all operating parts are directly driven by the pulley 14, substantially as described in my former application, Serial No. 411,534.

Mounted on an endless chain 28, are a plurality of toothed members 36, one member being rigidly secured to each link by the connecting bolts 37 thereof. On one side of each of the toothed or jaw members 26 are a plurality of sharp and comparatively straight and narrow teeth 38, and on the other side thereof, there are provided a plurality of comparatively dull and angular teeth 39, said jaw members and teeth being so arranged that each set of teeth 39 coincides with and extends slightly between each set of teeth 38 on the adjacent jaw member. It will be obvious that as said chain passes around the sprocket wheel, said jaw members will spread apart and open; whereas when the chain straightens out, they will close to such an extent that said teeth will extend between each other, as illustrated in Fig. 1. By means of this arrangement of jaws, as the chain travels about the sprocket wheels, the butt ends of the corn may be inserted between the jaw members as they pass around the sprocket wheel 30, and upon straightening out, the jaws will clamp the corn and the teeth bite through the butt so as to permit the ear of corn to be separated therefrom, and hold the butt with the shuck thereon so as to carry it through the machine for shredding. In arranging the teeth as illustrated herein, the shuck will be impaled on the sharp and narrow teeth 38 by the comparatively dull and more angular teeth 39, so that when the chain releases the sprocket wheel 29, the butt will be held on the teeth 38 and be carried thereby, against the duller teeth 39. By means of this arrangement, the butts may be knocked off of the teeth 38 and removed from the jaws by being carried against the bracket arms 31 mounted on one of the frame members and so arranged that the jaw members and teeth will pass between them, as illustrated in Figs. 1 and 5. It is obvious that the jaws may be arranged in other ways, whereby this same purpose may be accomplished such as omitting the teeth 39 and causing the jaw members to directly engage the butt and impale it upon the teeth 38, so long as the butt is bitten through and maintained upon the carrying chain during the remainder of the operations.

Mounted upon the end of the machine, as illustrated in Fig. 6, there is provided a feeding jaw consisting of two arms 32 and 33 pivotally mounted on the support 34 secured to the frame of the machine, as shown in Fig. 3, said jaw being in alignment with and adjacent the endless chain 28, and so positioned that an ear of corn being placed into the mouth of the jaw, will extend between the jaw members 36 and be engaged thereby and carried from the jaw as the chain revolves. The object of the jaw is to hold the corn in the proper position for feeding it between the jaws 36, whereby the butt of the corn will be properly engaged by said jaw members. This is necessary in order that the operator will not feed the corn so far into the carrying jaws that it will waste a large portion of the ear, but on the other hand, will feed it far enough in so that the butt will be firmly held for the removal of the corn. For this purpose, in order that the jaw may be properly adjusted for so feeding the corn, there is provided a laterally adjusting means consisting of the bolts 49 and lock nuts 50, and a vertical adjustment of the jaws for permitting smaller or larger portions of the butt to be engaged therein, by the yielding spring 51 mounted on the guide rod 52, which is fixedly secured in the jaw arm 33 and extends freely through the jaw arm 32. The rod 52 is provided with a nut and washer 53 against which the spring 51 will abut so as to yieldingly hold the arm 32 against the arm 33.

The corn is placed by the operator on the pan 54 and the butt end jammed in between the jaw members 32 and 33 between the carrying jaw members 36. The jaw members 36 then clamp the corn and carry it slowly along the operating portion of the machine, and as the corn passes over the chain 20, it is revolving in a clockwise direction, the teeth 55 which are rigidly mounted upon said chain, engage the shuck of the corn near the butt thereof on the under side and rip it longitudinally, thereby opening the shuck for permitting the ear to be ultimately removed. For guarding against the teeth 55 projecting so far into the corn as to engage and damage the grains, a table 56 is provided, mounted upon the frame by suitable brackets 156, over which the corn passes and through which the teeth extend only sufficiently to pass through the shuck, and not far enough to engage the grains. This table is adjusted by raising or lowering the same by placing shims under it. After this operation, the corn passes under the pivoted and yielding engaging plate 40, disposed at an angle, as shown in Figs. 2 and 6, and carried by the support 41 mounted on the frame. The plate 40 engages the free portion of the corn and bends it downwardly; whereas the jaws hold the butt rigidly. As the teeth 38 and 39 have bitten through the butt of the corn, the ear is broken from the butt by this downward bending, at the place where the teeth have bitten in. The corn after being broken is carried in the shuck, and upon approaching the wheel 35, the striking arm 42 strikes a blow near the butt of the corn, and knocks the ear free from the butt and out of the shuck through the slit and opening caused by the teeth 39.

The arm 42 is pivotally mounted at 57 on a disk 58 mounted on the wheel 35, and has a downwardly turned free striking end 59 in position to strike the corn as it is carried around during the revolution of the wheel 35. The opposite end of the arm 42 is bifurcated so as to embrace and ride upon the shaft 17. Upon being struck by the arm 42, the freed ear of corn drops down into a chute provided for the purpose and slides into a proper receptacle completely freed from the shuck and butt, which is still retained clamped in the carrying jaws.

The jaws carry the shuck, after the corn has been removed, further along the machine where it is first engaged by the ripping teeth 43, which extend laterally from the wheel 35, and then by the teeth 44, and lastly by the teeth 45. The arrangement of these teeth is such that their points are curved and are very sharp, although the edges of the teeth are dull and rounded. This causes the points to pierce the shuck and by the continued movement of the teeth, to rip the shuck longitudinally of its fiber. The teeth 44 are mounted at close intervals on each side of the wheel 35; whereas, the teeth 43 and 45 are arranged at greater intervals and extend out from the wheel so as to engage and rip any part of the shuck which may be spread laterally from the butt thereof. The comparatively rapid revolution of this shredding wheel, and the slow movement of the shuck, causes the entire surface thereof to be engaged and ripped by the teeth in such a manner that the shreds are mere threads after passing through the shredding action.

The shredded shuck is carried further along by the jaws until the shreds are cut off of the butt portion of the shuck by the revolving knife 46 mounted on the wheel 35. The knife 46 engages the shuck on the cutting plate 47 in a scissors-like manner, and the shreds of shuck then drop down into a suitable container.

The butt of the corn still remains fixed in the jaws until the jaws pass over the sprocket wheel 29, when they open up. The butt, which is impaled upon the long teeth 38, is carried thereby while it is released from the teeth 39, and as the jaw members 36 pass between the arms 31, the butt is removed from the teeth 38 and dropped into a container for that purpose.

The invention claimed is:

1. A corn husking and shredding machine including a gripping and carrying chain having means for biting through the corn ear and carrying it through the machine, means for removing the corn ear from the husk and shredding said husk, and means for engaging and positioning the corn ear with respect to said gripping members, whereby said ear will be properly gripped at the butt where it will be bitten through.

2. A shredding machine for corn shucks, means for gripping and carrying the corn ear through said machine, including means for removing the ear of corn from the butt and shredding the shucks thereof, and means adjustable laterally for properly positioning said corn ear with respect to said gripping and carrying means, whereby it will be gripped thereby at the junction of the ear and the butt.

3. A shredding machine for corn shucks, means for gripping and carrying the corn ear through said machine, including means for removing the ear of corn from the butt and shredding the shucks thereof, and adjustable yielding means against which the butt of the corn is adapted to be engaged, so that said butt will cause said means to yield and properly position it with respect to said gripping and carrying means, whereby the corn will be gripped and severed at the junction between the ear and the butt.

4. A shredding machine for corn shucks, means for gripping and carrying the corn ear through said machine, including means for removing the ear of corn from the butt and shredding the shucks thereof, and a jaw in which the butt of the corn is adapted to be inserted for holding and positioning said corn ear in proper position to be engaged by said gripping and carrying means at the junction of the ear and butt thereof.

5. In a shucking and shredding machine, the combination with means for carrying ears of corn therethrough, means for severing the ears from the butts thereof, and means for shredding the shucks from said ears, of a feeding jaw comprising two pivoted jaw members between which the butt of the corn is adapted to be placed, and yielding means for yieldingly holding said members together for clamping said butt of corn and maintaining it in proper position to be fed into said machine.

6. In a shucking and shredding machine, the combination with means for carrying ears of corn therethrough, means for severing the ears from the butts thereof, and means for shredding the shucks from said ears, of a feeding means, including two jaw members pivotally mounted on said machine, means for adjusting said jaw members laterally with respect to said feeding means, and yielding means for permitting said jaws to open under pressure, whereby upon the insertion of a rounded butt of corn therein, said jaw will open sufficiently to permit the proper positioning of the corn ear with respect to said carrying means.

7. In a shucking and shredding machine, the combination with means for carrying ears of corn therethrough, means for severing the ears from the butts thereof, and means for shredding the shucks from said ears, of means for feeding the corn ears into said machine consisting of a bracket mounted on said machine, a jaw comprising a pair of jaw members pivotally mounted to said bracket, a supporting pan for supporting an ear of corn in position to be inserted between said jaw members, and means for yieldingly maintaining said jaw in closed position, whereby the butt end of the ear may be engaged between said members and properly positioned with respect to said carrying means.

8. In a shucking and shredding machine, the combination with means for carrying ears of corn therethrough, means for severing the ears from the butts thereof, and means for shredding the shucks from said ears, of a carrying means for said ears including an endless chain mounted on sprocket wheels, and jaw members fixedly secured to each link of said chain having on one side thereof a plurality of impaling members on which the butt of the ear is adapted to be impaled, and means for engaging and impaling the butts, whereby said butts will be retained on said impaling members while passing through said machine.

9. In a shucking and shredding machine, the combination with means for carrying ears of corn therethrough, means for severing the ears from the butts thereof, and means for shredding the shucks from said ears, of a carrying means for said ears including an endless chain mounted on sprocket wheels, jaw members fixedly secured to each link of said chain having on one side thereof a plurality of impaling members on which the butt of the ear is adapted to be impaled, means for engaging and impaling the butts, whereby said butts will be retained on said impaling members while passing through said machine, and means for engaging and removing said butts from said impaling members after having passed through said machine.

10. In a shucking and shredding machine, the combination with means for carrying ears of corn therethrough, means for severing the ears from the butts thereof, and means for shredding the shucks from said ears, of a carrying means for said ears including an endless chain mounted on sprocket wheels, jaw members fixedly secured to each link of said chain, having on one side thereof a plurality of impaling members on which the butt of the ear is adapted to be impaled, means for engaging and impaling the butts, whereby said butts will be retained on said impaling members while passing through said machine, and a bar mounted on said machine adjacent said carrying means in position to engage the butt as said carrying means passes about a sprocket for forcing it from said impaling means.

11. In a shucking and shredding machine, the combination with means for carrying ears of corn therethrough, means for severing the ears from the butts thereof, and means for shredding the shucks from said ears, of a carrying means for said ears including an endless chain mounted on sprocket wheels, jaw members fixedly secured to each link of said chain, having on one side thereof a plurality of thin sharp teeth on which the butt of the ear is adapted to be impaled, and a plurality of dull teeth mounted oppositely thereto for gripping said ear and impaling it on said sharp teeth of the adjacent member, whereby the butt of the corn will be carried through the machine and be in position to be readily removed from the impaling teeth of said jaw members.

12. In a shucking and shredding machine, the combination with means for carrying ears of corn therethrough, means for severing the ears from the butts thereof, and means for shredding the shucks from said ears, of a carrying means for said ears, means for removing the butt of the corn therefrom, said carrying means consisting of means for severing said ear from said butt and carrying said butt through said machine in such a position that it may be readily removed therefrom by its engagement with said removing means.

13. In a shucking and shredding machine, the combination with means for carrying ears of corn therethrough, means for severing the ears from the butts thereof, and means for shredding the shucks from said ears, of means for removing the ears from said shucks including means for opening said shucks, an eccentric reciprocating member, and means for driving said member whereby it will engage and strike the ear of corn adjacent the butt thereof for knocking it from said butt and shuck.

14. In a shucking and shredding machine, the combination with means for carrying ears of corn therethrough, means for severing the ears from the butts thereof, and means for shredding the shucks from said ears, of means for removing the ears from said shucks, including means for opening said shucks, and an arm pivotally mounted on an eccentric near its engaging end, slidably mounted on said machine at the other end thereof and eccentrically and reciprocatorily operated by the rotary motion of said eccentric for striking and pulling the ear from the butt and forcing it from the shuck.

15. In a shucking and shredding machine, the combination with means for carrying ears of corn therethrough, means for severing the ears from the butts thereof, and means for shredding the shucks from said ears, of means for removing the ears from said shucks, including means for opening said shucks, a revolving disk, and an engaging arm eccentrically pivoted on said disk, said engaging arm being provided with a slot in one end for embracing and sliding upon a fixed member of said machine and provided with a downwardly turned striking end for striking the ear of corn adjacent the butt thereof with an eccentric and reciprocating motion, whereby said ear will be broken from the butt and pulled away therefrom and forced out of the shuck.

In witness whereof, I have hereunto affixed my signature.

GEORGE A. LOWRY.